US010237765B1

United States Patent
Bradley

(10) Patent No.: US 10,237,765 B1
(45) Date of Patent: Mar. 19, 2019

(54) PASSIVE INTERMODULATION (PIM) MEASURING INSTRUMENT AND METHOD OF MEASURING PIM

(71) Applicant: ANRITSU COMPANY, Morgan Hill, CA (US)

(72) Inventor: Donald Anthony Bradley, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 16/125,499

(22) Filed: Sep. 7, 2018

(51) Int. Cl.
*H04W 4/00* (2018.01)
*H04W 24/06* (2009.01)
*H04B 17/345* (2015.01)
*H04B 17/00* (2015.01)

(52) U.S. Cl.
CPC ........ *H04W 24/06* (2013.01); *H04B 17/0085* (2013.01); *H04B 17/345* (2015.01)

(58) Field of Classification Search
CPC .. H04W 24/06; H04B 17/345; H04B 17/0085
USPC ....................................................... 455/423
See application file for complete search history.

(56) References Cited

U.S. PATENT DOCUMENTS

| 8,058,880 B2 | 11/2011 | Bradley et al. | |
| 2014/0146866 A1* | 5/2014 | Strachan | H04B 7/309 |
| | | | 375/226 |

OTHER PUBLICATIONS

"60 GHz Receiver (Rx) Waveguide Module", Pasternack Enterprises, Inc., 2016, 18 pages.
"60 GHz Transmitter (Tx) Waveguide Module", Pasternack Enterprises, Inc., 2016, 18 pages.
Holzman, Eric L., "A Highly Compact 60-GHz Lens-Corrected Conical Horn Antenna", IEEE Antennas and Wireless Propagation Letters, vol. 3, 2004, pp. 280-282, 3 pages.
"WR-15 Waveguide Horn Antenna Operating Form 50 GHz to 75 GHz With a Nominal 42 dBi Gain With UG-385/U Round Cover Flange", Pasternack Enterprises, Inc., 2017, 3 pages.

* cited by examiner

*Primary Examiner* — Marcos Batista
(74) *Attorney, Agent, or Firm* — Tucker Ellis LLP

(57) ABSTRACT

A measuring instrument for detecting a source of passive intermodulation (PIM) includes a signal source, a reference signal source, and a first transmitter module and a second transmitter module each configured to receive a signal from the signal source and a reference signal from the reference signal source and generate a tone at a first frequency and a second frequency, respectively. The measuring instrument further includes a receiver and a receiver module configured to receive the signal from the signal source and a harmonic of the test signal generated by a source of PIM to generate a sample signal at the fixed frequency of the reference signal. The receiver is configured to determine a shift in phase between the reference signal and the sample signal. The receiver determines an estimate of distance to the source of PIM using determinations of the shift in phase as the signal source is swept.

15 Claims, 4 Drawing Sheets

PASSIVE INTERMODULATION (PIM) MEASURING INSTRUMENT AND METHOD OF MEASURING PIM

TECHNICAL FIELD

The present invention relates to measuring instruments for measuring passive intermodulation (PIM) and for estimating distances to sources of PIM.

BACKGROUND

Passive intermodulation (PIM), commonly referred to as "rusty bolt effect," is the generation of unwanted signals by the non-linear mixing of two or more frequencies in a passive device, such as a connector or cable, that normally behaves linearly but when subject to high radio frequency (RF) power tones behaves nonlinearly. Non-linear behavior affecting a system can result, for example, from a loose or corroded connector or from the close proximity of the system to oxidized metal. Non-linear behavior affecting a system emitting RF signals can also result from the re-radiation of emitted signals from sources outside of the system, such as unrelated antennas, lighting fixtures, HVAC ducts, exposed metal such as roof flashing, unexposed metal and fasteners hidden beneath roofing tar, etc.

PIM has surfaced as a particular problem for cellular systems. If the generated PIM harmonic frequency components fall within the receive band of a base station of a cellular site, they can effectively block a channel and make the base station receiver think that a carrier signal is present when one is not. Generally the harmonics of concern are third, fifth, and seventh order, where the third order is of greatest signal strength, and therefore, of primary concern.

Test systems are available to measure PIM by creating signals at different frequencies, amplifying and combining them, and providing them to components of a cellular system and measuring a reflected signal generated by a PIM source within the components. Once a PIM source is identified, PIM can be reduced or eliminated by replacing or removing the PIM source. For example, PIM is commonly resolved by replacing faulty cables or connectors, or by removing re-radiating sources.

While such test systems may be effective for identifying PIM sources within a cellular system, other sources of PIM existing outside of the cellular system such as the environment surrounding the cellular system are not identifiable by measuring the response of the components internal to the cellular system. Test systems for measuring PIM can be connected via a test port to a transmit/receive antenna to detect PIM beyond the antenna and to approximate a distance to the source of the PIM. However, while the distance can be approximated, the direction may not be easily determined with a typical antenna usable for PIM detection. Further, such test systems can be bulky and high powered, making them impractical for mobile use in tracking down PIM sources in the field, external to the affected system.

SUMMARY

In accordance with an embodiment, a measuring instrument for detecting a source of passive intermodulation (PIM) includes a signal source, a reference signal source, and first and second transmitter modules each configured to receive a signal from the signal source and a reference signal from the reference signal source and generate a tone at a first frequency and a second frequency, respectively. The measuring instrument further includes a receiver and a receiver module configured to receive the signal from the signal source and a harmonic of the test signal generated by a source of PIM to generate a sample signal at the fixed frequency of the reference signal. The receiver is configured to determine a shift in phase between the reference signal and the sample signal. The receiver determines an estimate of distance to the source of PIM using determinations of the shift in phase as the signal source is swept.

In accordance with an embodiment, a measuring instrument for detecting a source of PIM includes a signal source configured to provide a signal and to sweep the signal through a range of frequencies, a reference signal source configured to provide a reference signal at a fixed frequency, an antenna configured to receive and transmit a test signal having at least two tones generated using the signal and the reference signal, and a receiver. The measuring instrument further includes a first transmitter module configured to receive the signal from the signal source and the reference signal from the reference signal source and generate a first tone at a first frequency that is swept when the signal from the signal source is swept, a second transmitter module configured to receive the signal from the signal source and the reference signal from the reference signal source and generate a second tone at a second frequency different from the first frequency that is swept when the signal from the signal source is swept and an antenna configured to transmit a test signal comprising at least the first and second tones.

In accordance with a further embodiment, the measuring instrument further includes a combiner configured to receive the first tone from the first transmitter module and the second tone from the second transmitter module and output the test signal comprising the first tone and the second tone to the antenna. The measuring instrument further includes a receiver module configured to receive the signal from the signal source and a harmonic of the test signal generated by a source of PIM and generate a sample signal at the fixed frequency of the reference signal. The receiver is configured to determine a shift in phase between the reference signal and the sample signal. The receiver is further configured to determine an estimate of distance to the source of PIM using determinations of the shift in phase as the signal source is swept.

In accordance with a further embodiment, the antenna is configured to receive the harmonic of the test signal and pass the harmonic to the receiver module using the combiner. Further, the combiner can be a cavity filter including one or more cavities for each tone tuned to a center frequency of that tone. The first transmitter and the second transmitter are each configured to generate a millimeter wave from a signal provided by the signal source having a frequency from the very high frequency (VHF) and/or ultra high frequency (UHF) range.

In accordance with a further embodiment, the measuring instrument further includes a third transmitter module configured to receive the signal from the signal source and the reference signal from the reference signal source and generate a third tone at a third frequency different from the first frequency and the second frequency that is swept when the signal from the signal source is swept.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Figure 1:
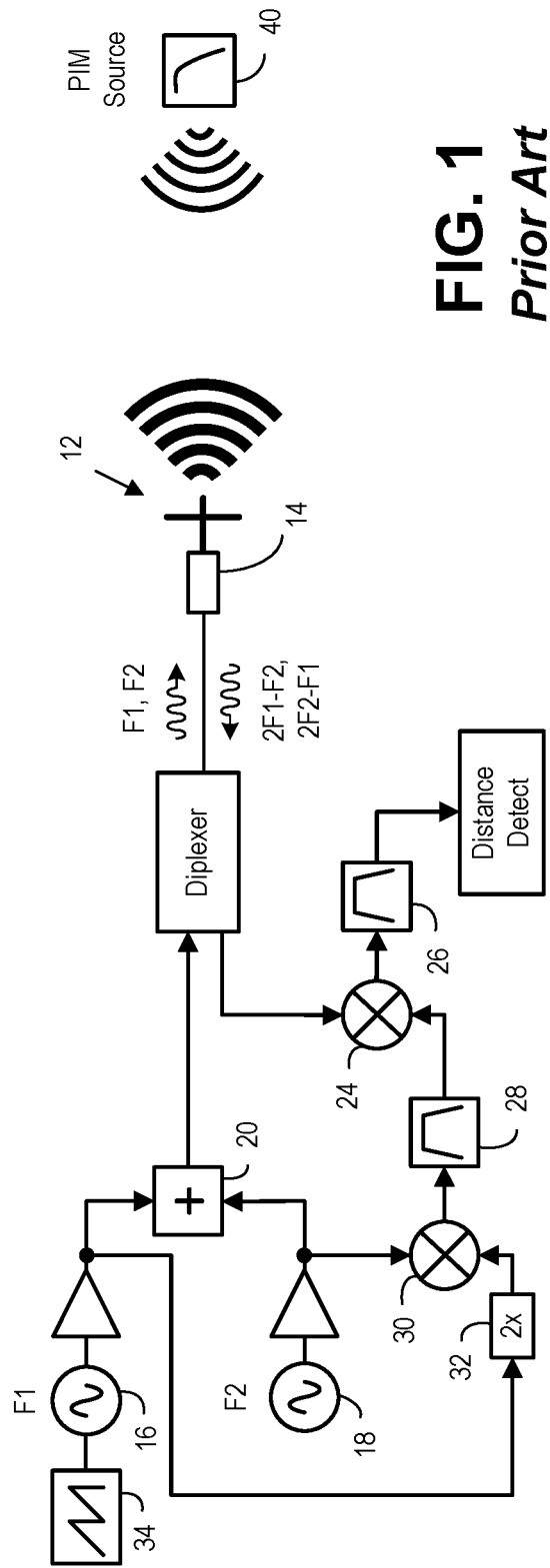
FIG. 1 is a simplified block diagram of a measuring instrument for measuring PIM and for determining a distance to a source of PIM, in accordance with the prior art.

FIG. 1 is a block diagram of an exemplary measuring instrument 10 usable with an antenna 12 for measuring PIM generated by a PIM source 40 using frequency modulated, continuous wave or pulsed signals. The measuring instrument resembles measuring instruments described, for example, in U.S. Pat. No. 8,058,880 entitled "CALIBRATED TWO PORT PASSIVE INTERMODULATION (PIM) DISTANCE TO FAULT ANALYZER" issued to Bradley, et al. and incorporated herein by reference, and is merely exemplary.

The measuring instrument utilizes two signal sources, with a first signal source 16 producing a signal at frequency F1 and a second signal source 18 producing a signal at fixed frequency F2. A frequency modulated (FM) sweep can be introduced using a sweep generator 34 connected to the first signal source. The signals are provided to a combiner 20 to create a combined test signal with frequency components F1 and F2 at the combiner output. A diplexer passes the test signal to a test port 14 connected with the antenna, which transmits the test signal. When the test signal is transmitted to the PIM source, unwanted PIM signals comprising harmonics of the test signal are generated and can be reflected or reradiated back to the antenna.

The third order response of the reflected signal is of particular interest as it includes signals of higher power relative to other harmonics. For the test signal having components F1 and F2, the third order response occurs at frequencies 2F1-F2 and 2F2-F1. PIM signals reflected or reradiated back and received at the antenna include these third order signals, one or both of which can be filtered and forwarded to be downconverted to an intermediate frequency (IF) for processing. The received signal is downconverted to a target intermediate frequency and the magnitude of the IF signal is measured by a receiver.

The measuring instrument is further usable for determining a distance to the PIM source. As illustrated, a test signal having frequency components comprising the frequency modulated sweep signal F1 and the fixed signal F2, can stimulate the PIM source to produce the additional signals 2(F1+FM)−F2 and 2F2−(F1+FM). The delayed-in-time (distance) signal 2(F1+FM)−F2 can be mixed with an internally generated, non-delayed signal 2(F1+FM)−F2 to produce the desired measurement signal ΔF. A distance-to-fault from the antenna can be determined based on ΔF.

To provide a signal source for downconversion, a 2× frequency multiplier 32 connected to the first signal source provides a swept output to a first input of a mixer 30. A second input of the mixer is provided by the second signal source to generate the non-delayed signal. A bandpass filter 28 eliminates undesired mixing products from the mixer to provide a first input to a downconverting mixer 24. A second input of the downconverting mixer is provided from a diplexer that filters the received signal from the PIM source. The output of the downconverting mixer leaves substantially only the frequency deviation ΔF due to the PIM signal generated by the PIM source. A low-pass filter 26 removes undesired mixing products, leaving only a forward trace sweep ΔF and retrace sweep signal 45 MHz−ΔF. Measurement of ΔF with a digital receiver using Fourier transform to time domain or a spectrum analyzer gives a measurement of total distance of the test port to the PIM source, with post processing to account for the both the forward sweep ΔF and retrace 45 MHz−ΔF.

The measuring instrument of FIG. 1 is merely exemplary, and measuring instruments for measuring PIM magnitude and distance to a PIM source can include different and/or additional components, and other configurations can be used to measure PIM magnitude and/or distance to a PIM source.

A measuring instrument can be connected with an antenna installed at a cellular site and intended for transmitting and receiving cellular signals from user equipment, for example, to transmit test signals for measuring PIM affecting that cellular site. As an example, antennas for cellular sites installed on roofs or telephone poles can commonly exhibit about 13 decibels (dB) of gain. In a typical test setup, a measuring instrument as described above in FIG. 1 transmits a test signal comprising a 20 Watt (W) tone generated by the first signal source and a 20 W tone generated by the second signal source.

A PIM source located in the environment surrounding the cellular site that is negatively impacting performance of the cellular site will likely generate a PIM signal detectable with the measuring instrument performing a sweep of frequencies. As described above, the measuring instrument can detect the magnitude of the PIM signal, and in some configurations can detect a distance to the PIM source. However, the generally wide radiation pattern of such an antenna can prevent or frustrate the ability to readily identify a location of the PIM source. Further, measuring instruments configured for generating 2×20 W tones are generally bulky and cumbersome, and consume a great deal of power, and can be difficult to use portably, even with a directional antenna such as a Yagi antenna connected at the test port.

It can be useful and/or desirable for transmitted signals to have a radiated power comparable to or greater than the radiated power of test signals comprising two 20 W tones generated, for example, by a measuring instrument as described above and transmitted via an antenna of a test site, such as a cellular site. Preferably, the power of the signals irradiating the PIM source is matched or exceeded, as it is known that such power is a power at which PIM signals are reflected or reradiated by the PIM source such that the PIM signals cause problems at the test site. However, the PIM source can be irradiated with higher power signals and the PIM source will reflect or reradiate a PIM approximately 2.5 dB higher for every 1 dB of increased power. However power can be expensive as test signal frequencies increase, including into the millimeter range (i.e., above 30 GHz).

A radiated power comparable to or greater than the radiated power of the test setup described above can be achieved with test signals generated at comparatively lower power by reducing the size of the signal wavefront created by an antenna transmitting the lower power test signals. The gain of a transmit antenna is proportional to the radiated beam width of the antenna. By increasing a frequency of a test signal, the radiated beam width of the antenna can be reduced and the gain of the antenna thereby increased. As an example, gain achieved with an antenna having a diameter of 30 inches transmitting a 6 GHz signal can be roughly achieved by an antenna having a diameter of 3 inches transmitting a 60 GHz signal.

Compact antennas have been demonstrated that can transmit comparatively higher frequency signals having substantially reduced signal wavefronts relative to typical antennas of test sites including cellular and other sites. A test signal amplified to a power of 1 W internal to a measuring instrument can achieve radiated power levels using a compact antenna that are comparable to the radiated power levels of signals transmitted by the test setup described above with a measuring instrument generating a test signal comprising two 20 W tones connected with the test site antenna.

Figure 2:
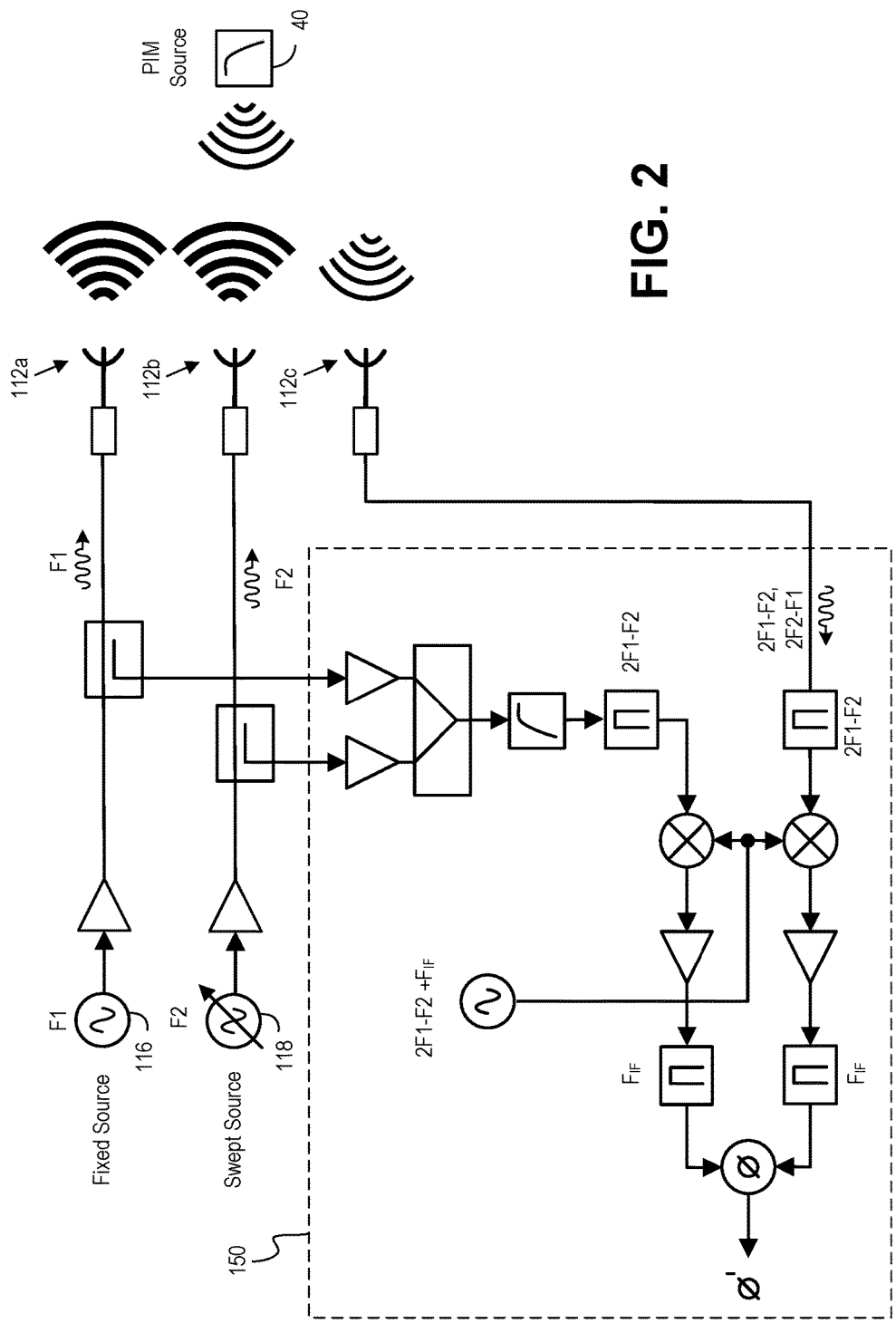
FIG. 2 is a simplified block diagram of a measuring instrument for measuring PIM and for determining a distance to a source of PIM using millimeter waves.

Referring to FIG. 2, a measuring instrument 100 for generating and transmitting test signals in the millimeter wave range is shown. The measuring instrument is described, for example, in U.S. patent application Ser. No. 15/668,507 entitled "COMPACT PASSIVE INTERMODULATION (PIM) MEASURING INSTRUMENT" by Bradley, which is incorporated herein by reference. The measuring instrument is illustrated comprising a pair of transmit antennas 112a, 112b that transmit two separate tones, generated by a first signal source 116 and a second signal source 118, respectively, isolated from each other and not combined internally to the measuring instrument to ensure that PIM is not generated internally by interaction of the signal sources. As shown, the first signal source can be used to generate a fixed signal, F1, while the second signal source can be used to generate a swept signal, F2.

The transmit antennas are arranged in a fixed or otherwise known position relative to one another so that signals transmitted by the antennas can interact and the signal components combine so that the combined test signal will stimulate the generation of PIM at a PIM source 40. The transmit antennas have beam widths of approximately 6 degrees, so that when arranged in proximity to one another and flat surface mounted relative to one another the transmitted beams will overlap so as to create a test signal of multiple frequency components to stimulate generation of PIM products.

The measuring instrument further comprises a receive antenna 112c for receiving PIM signals reflected or reradiated by a PIM source in response to transmitted signals. A receiver 150 is used to measure PIM signals generated by the PIM source and, where configured to do so, measure a distance to the PIM source. A distance to a detected PIM source is determined using techniques similar to those described above where the frequency of the signal transmitted by one of the two signal sources is swept while the receiver is swept over the frequencies of the intermodulation products.

The transmit and receive antennas each comprise a conical horn antenna adapted to transmit high frequency signals having substantially reduced signal fronts relative to typical antennas of cellular and other sites. The transmit and receive antennas can each comprise a highly compact, lens-corrected conical horn antenna. The measuring instrument can, using signal sources generating a pair of tones each amplified to powers of 1 W internal to the measuring instrument, achieve radiated power levels that are comparable to or greater than the radiated power levels of signals transmitted by the test setup described above in FIG. 1 with a measuring instrument generating a test signal comprising two 20 W tones connected with the test site antenna.

While use of a conical horn antenna, as described above and illustrated in FIG. 2, provides for sufficient gain that a measuring instrument with internal amplifiers that amplify millimeter wave signals generated by the measuring instrument to 1 W enables transmission by the antenna of two 20 W tones, it has been observed that such amplifiers for generating 1 W millimeter wave signals are currently relatively expensive, raising the total cost of the measuring instrument, which includes at least two such amplifiers.

Methods and measuring instruments in accordance with embodiments of the present invention can stimulate the generation of PIM at a PIM source and measure reflected and/or re-reradiated PIM signals using components capable of inclusion in a relatively compact, low power form factor. Such embodiments can enable the use of portable instruments that allow an environment to be explored and tested to identify the location of a PIM source.

Figure 3:
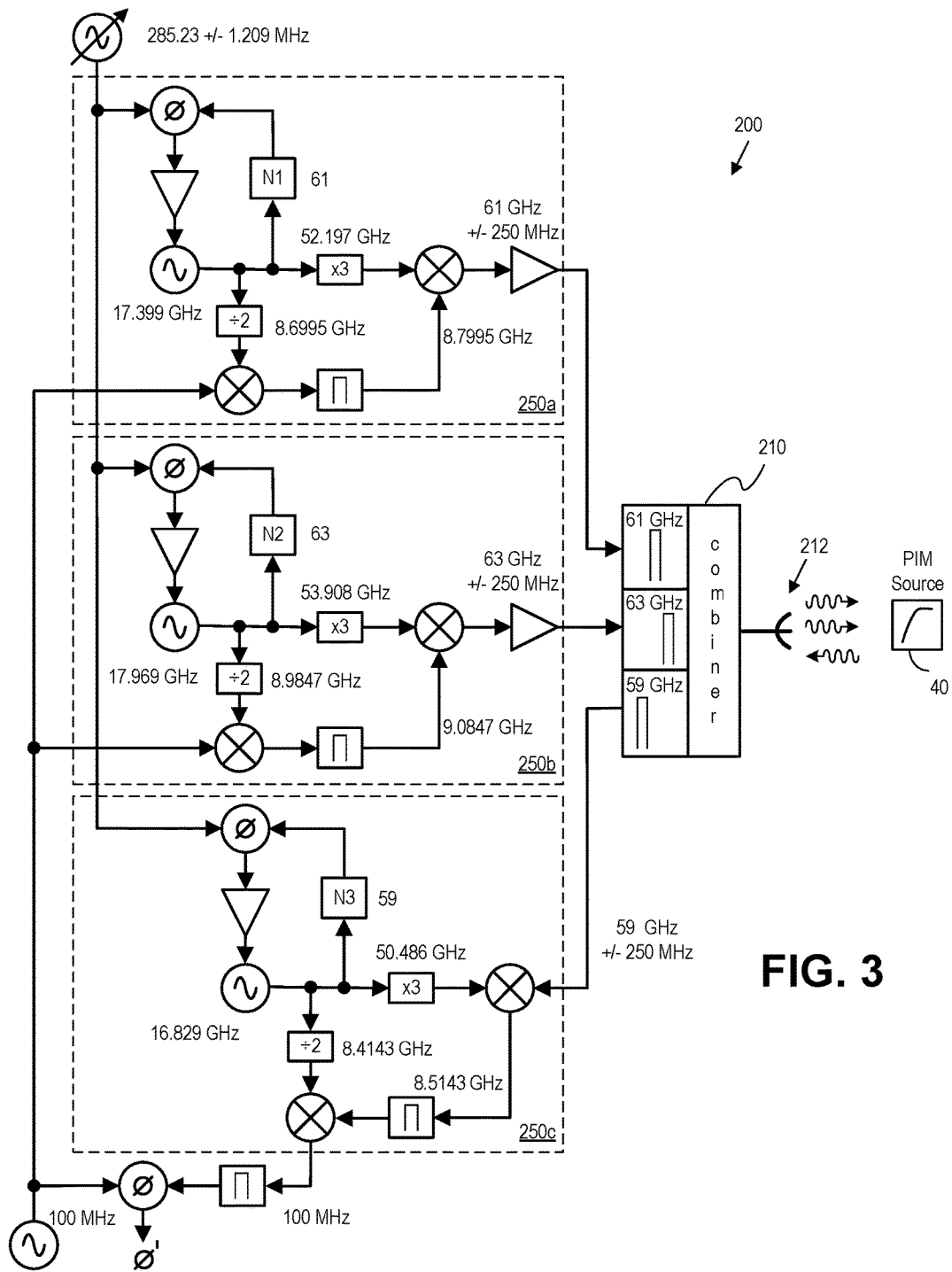
FIG. 3 is a simplified block diagram of a measuring instrument for measuring PIM and for determining a distance to a source of PIM using millimeter waves, in accordance with an embodiment.

FIG. 3 illustrates a measuring instrument 200 in accordance with an embodiment comprising a single antenna 212 configured to transmit signals comprising two tones and receive PIM signals in response to the transmitted signals. The measuring instrument comprises two transmitter modules 250a, 250b, each receiving as input a swept signal and a fixed reference signal generated by the measuring instrument and outputting a millimeter wave signal. The millimeter wave signals are output by the two transmitter modules at two different tones that are phase synchronized, combined at a combiner 210 and transmitted by the single antenna. The measuring instrument further comprises a receiver module 250c, which receives at the antenna PIM reflected or reradiated by a PIM source 40. In other embodiments, the measuring instrument can generate test signals having more than two tones and receive PIM signals at two or more center frequencies.

In accordance with an embodiment, each of the two transmitter modules can comprise, for example, a PEM010 model integrated millimeter wave transmitter available from PASTERNACK®, a supplier of RF and microwave components. Such a transmitter module comprises a waveguide interface connecting a chip with a waveguide port and is designed for data transmission, millimeter wave radar, millimeter wave imaging, but in an embodiment can be configured to be interfaced with a measuring instrument to output two tones offset from one another in frequency.

In an embodiment, transmitter modules and receiver module(s) can be selected to generate and transmit signals in the unlicensed (or lightly licensed) spectrum of the 60 GHz V-Band allocated by the FCC for millimeter waves. In other embodiments, the measuring instrument can include transmitter modules and receiver module(s) selected and/or configured to operate outside of this frequency spectrum.

As illustrated in FIG. 3, exemplary signal frequencies are provided; however, they are merely provided to aid in teaching the operation of certain embodiments of the invention. As shown, a swept signal source generates an input signal that is provided to each of the transmitter modules centered at 285.23 MHz+/−1.209 MHz (i.e., swept over 2.418 MHz). The signal generated by the signal source is provided to a phase-locked loop (PLL) of each of the transmitter modules. In addition to the swept signal source, the transmitter modules receive a fixed reference signal (e.g., 100 MHz, as shown) so that the swept and fixed reference signals together drive each of the transmitter modules.

As illustrated, the first transmitter module is programmable to divide a frequency of an oscillator signal of the PLL by an integer value, N1, based on a center frequency of a first target output signal (e.g., an integer value of 61 for a target output signal having a center frequency of 61 GHz). The oscillator internally generates a signal having a frequency of 17.399 GHz phase-locked to the input signal from the signal source of 285.23 MHz, and consequently swept with the input signal of the signal source. The fixed reference signal is provided to a quadrature mixer that receives a signal from the oscillator with a divided frequency and outputs a signal with a sideband frequency comprising the difference in frequency between the fixed reference signal and the received signal. The resulting signal is mixed with a signal from the oscillator having a multiplied frequency to output the first target output signal having a combined frequency comprising a swept tone of substantially 61 GHz+/−250 MHz, which is amplified and provided to the combiner. In an embodiment, the amplifier of the transmitter module can output a power of approximately +15 dBm.

As illustrated, the second transmitter module is programmable to divide a frequency of an oscillator signal of the PLL by an integer, N2, value based on the center frequency of a second target output signal (e.g., an integer value of 63 for a target output signal having a center frequency of 63 GHz). The oscillator internally generates a signal having a frequency of 17.969 GHz phase-locked to the input signal from the signal source of 285.23 MHz and swept with the input signal of the signal source. The fixed reference signal is similarly provided to the second transmitter module and the second transmitter module outputs a swept tone of substantially 63 GHz+/−250 MHz, which is amplified and provided to the combiner. In an embodiment, the amplifier of the transmitter module can output a power of approximately +15 dBm.

The two tones, generated at 61 GHz+/−250 MHz and 63 GHz+/−250 MHz, are combined at the combiner and phase locked by the common, swept signal source and transmitted by the antenna as a test signal to stimulate a PIM source to generate PIM at different harmonics, including PIM signals reflected or reradiated as a third order harmonic having a frequency of 59 GHz+/−250 MHz. In addition, the combiner can pass PIM signals received at the antenna to a receiver of the measuring instrument.

In accordance with an embodiment, the receiver module can comprise, for example, a PEM002 model integrated millimeter wave receiver also available from PASTERNACK®. Such a receiver module comprises a waveguide interface connecting a chip with a waveguide port and is designed for data transmission, millimeter wave radar, millimeter wave imaging, but in an embodiment can be configured to be interfaced with a measuring instrument to receive a PIM signal from PIM harmonic signals reflected or reradiated by PIM sources in response to test signals comprising two or more tones.

As illustrated, the receiver module is programmable to divide a frequency of an oscillator signal of the PLL by an integer value, N3, based on a center frequency of a target input signal (e.g., an integer value of 59 for a target input signal having a center frequency of 59 GHz). The oscillator internally generates a signal having a frequency of 16.829 GHz phase-locked to the input signal from the signal source of 285.23 MHz, and consequently swept with the input signal of the signal source. The fixed reference signal is provided to a comparator of a receiver of the measuring instrument that also receives a signal generated based on a downconverted signal, as described below, generated from a received signal having a frequency of substantially 59 GHz+/−250 MHz (i.e., a third order PIM product generated at a PIM source in response to a signal comprising 61 GHz and 63 GHz tones).

The received signal is passed to the receiver module by the combiner after being received at the antenna and is an input to a mixer that also receives a signal from the oscillator with a multiplied frequency and outputs a signal with a frequency comprising the difference in frequency between the two signals. The resulting signal is mixed with a signal from the oscillator having a divided frequency provided to a quadrature mixer to output a downconverted signal comprising the difference in frequency between the two signals, (i.e., 100 MHz).

The downconverted signal is provided to the receiver of the measuring instrument which includes the comparator. The comparator outputs a shift in phase, $\phi'$, between the fixed reference signal and the downconverted signal as the frequency is swept, and based on the measurements of phase shift over the sweep, an estimate of distance can be determined. In contrast to prior art measuring instruments and techniques that sample a transmit signal and use the sampled transmit signal in the receiver of the measuring instrument to determine a distance from a shift in phase, embodiments in accordance with the present invention rely on a fixed reference signal to provide a reference for determining a phase shift.

As previously described, the signal frequencies are merely exemplary and modules can be programmed to generate signals having different frequencies than those illustrated and described. The frequencies of signals are chosen so that a shift in phase of a PIM signal received from a PIM source relative to a fixed reference frequency can be measured for use in determining an estimate of distance to that PIM source. Further, a resolution of the distance estimate can depend on the sweep width and the step size of the sweep (and consequent number of weep samples). The distance for which embodiments of the measuring instrument can reliably be used can vary with the number of measurements which comprise the sweep. The sweep distance (e.g., 500 MHz) can depend on components of the measuring instruments including filter components of the measuring instrument.

In an embodiment, the combiner can comprise a triplexer. In an embodiment, the triplexer can comprise a cavity filter with at least one cavity configured to act as a filter for signals having frequencies centered at each of the designed-for transmit tones and receive tones. Such cavity filters are described, merely for example, in U.S. Pat. No. 9,977,068 entitled "FREQUENCY MULTIPLEXER FOR USE WITH INSTRUMENTS FOR MEASURING PASSIVE INTERMODULATION (PIM)" issued to Bradley, and incorporated herein by reference. Cavities for passing signals having frequencies in the millimeter wave range are relatively small compared with signals having relatively lower frequencies, and can be tuned as appropriate. The transmitter modules and receiver module(s) can be connected with the cavity filter via a rectangular waveguide (e.g., via a WR15 waveguide port), although in other embodiments some other interface and/or transmission medium can be used.

In an embodiment, the measuring instrument comprises an antenna with sufficient gain to be usable over a desired distance to detect a PIM source. For example, an available antenna providing a gain of 42 dBi includes an antenna having a diameter of approximately 10 inches and a depth of approximately 8 inches, which depth can further be reduced using a compact horn antenna including a hyperbolic lens usable to reduce the horn focal length, and thereby reduce a minimum housing thickness of the measuring instrument.

The distance to which the measuring instrument is reliably usable to detect a typical source of PIM can depend on a noise floor of the measuring instrument, the transmit power and antenna gain. For example, assuming an antenna gain of 42 dBi and +15 dBm output power, a receive power of −96 dBm corresponds to a distance of 15 meters. Where a receiver noise floor for the measuring instrument is about −130 dBm, a corresponding distance at which the measuring instrument is usable is approximately 45 meters, for example.

In accordance with an embodiment, a measuring instrument comprising components as described above can be incorporated into a single portable housing of low weight, driven by relatively low DC power with high directional ability due to the narrower beam width of a single antenna.

In accordance with an embodiment, the measuring instrument can include a display for displaying a PIM measurement and a keypad for input. However, in other embodiments, the measuring instrument can include a touch screen display for input rather than a keypad. In still other embodiments, the measuring instrument need not necessarily include a display or input device, but rather merely include a power switch and an indicator for indicating detection of a PIM source. As an example, the measuring instrument can include a trigger grip optionally including electronic components built into the grip and either a flashing LED or other visual signal, an audial signal such as a beep whose pitch or frequency increases with detection, or a tactile response by the measuring instrument indicating detection.

In accordance with an embodiment, the measuring instrument can further include a visual indicator, such as a laser sight, that can indicate a general location of a PIM source by highlighting the general location via a visible-light laser. This can be useful, for example, at a location where a PIM source is concealed, such as a piece of roof flashing hidden under roofing tar. A laser sight can be located at the back of the measuring instrument, for example. Further, light emitted by a laser can also include a distance function similar to laser range finders. Using the laser, a distance to a PIM source and the travel distance of the laser can be matched to indicate where the PIM source is located.

Figure 4:
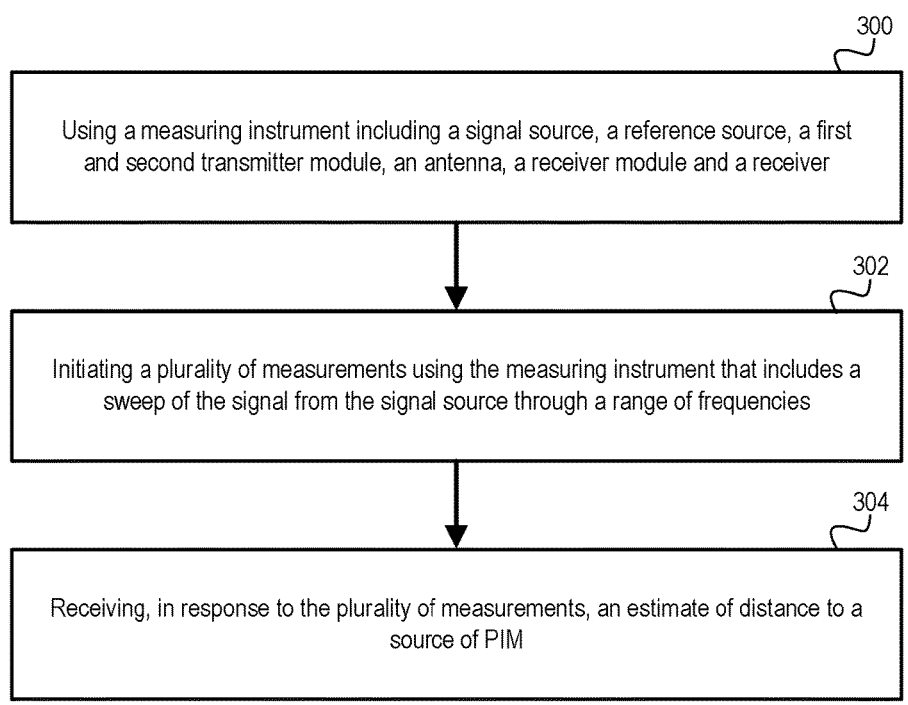
FIG. 4 is a flowchart of a method for determining a distance to a source of PIM using millimeter waves, in accordance with an embodiment.

FIG. 4 is a flowchart of a method for determining a distance to a source of PIM using millimeter waves, in accordance with an embodiment. The method comprises using a measuring instrument in accordance with embodiments described above (Step 300), initiating a plurality of measurements using the measuring instrument that includes a sweep of the signal from the signal source through a range of frequencies (Step 302), and receiving, in response to the plurality of measurements, an estimate of distance to a source of PIM (Step 304).

The measuring instrument of the method of FIG. 4 can include, for example, a signal source, a reference signal source, a first transmitter module configured to generate a first tone at a first frequency, a second transmitter module configured to generate a second tone at a second frequency different from the first frequency, an antenna configured to transmit a test signal comprising the first tone and the second tone, a receiver module configured to generate a sample signal, and a receiver configured to determine a shift in phase between the reference signal and the sample signal.

The first transmitter module can be configured to generate the first tone from a signal received from the signal source and a reference signal received from the reference signal source, while the second transmitter module can be configured to generate the second tone from the signal received from the signal source and the reference signal received from the reference signal source. The receiver module can be configured to generate a sample signal at the fixed frequency of the reference signal from the signal received from the signal source and a harmonic of the test signal generated by a source of PIM and received at the antenna.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMS, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A measuring instrument for detecting a source of passive intermodulation (PIM) and determining a distance to the source, the measuring instrument comprising:
   a signal source configured to provide a signal and to sweep the signal through a range of frequencies;
   a reference signal source configured to provide a reference signal at a fixed frequency;
   a first transmitter module configured to receive the signal from the signal source and the reference signal from the reference signal source and generate a first tone at a first frequency that is swept when the signal from the signal source is swept;
   a second transmitter module configured to receive the signal from the signal source and the reference signal from the reference signal source and generate a second tone at a second frequency different from the first frequency that is swept when the signal from the signal source is swept;
   a combiner configured to receive the first tone from the first transmitter module and the second tone from the second transmitter module and output a test signal comprising the first tone and the second tone;
   an antenna configured to receive and transmit the test signal;
   a receiver module configured to receive the signal from the signal source and a harmonic of the test signal generated by a source of PIM and generate a sample signal at the fixed frequency of the reference signal; and a receiver configured to determine a shift in phase between the reference signal and the sample signal;
wherein the receiver is configured to determine an estimate of distance to the source of PIM using determinations of the shift in phase as the signal source is swept.

2. The measuring instrument of claim 1, wherein the antenna is configured to receive the harmonic of the test signal and pass the harmonic to the receiver module using the combiner.

3. The measuring instrument of claim 1, wherein the combiner is a cavity filter including one or more cavities for each tone tuned to a center frequency of each tone.

4. The measuring instrument of claim 1, wherein the first transmitter and the second transmitter are each configured to generate a millimeter wave from a signal provided by the signal source having a frequency from the very high frequency (VHF) and/or ultra high frequency (UHF) range.

5. The measuring instrument of claim 1, further comprising a third transmitter module configured to receive the signal from the signal source and the reference signal from the reference signal source and generate a third tone at a third frequency different from the first frequency and the second frequency that is swept when the signal from the signal source is swept.

6. A measuring instrument for detecting a source of passive intermodulation (PIM) and determining a distance to the source, the measuring instrument comprising:
a signal source;
a reference signal source;
a first transmitter module configured to receive a signal from the signal source and a reference signal from the reference signal source and generate a first tone at a first frequency;
a second transmitter module configured to receive the signal from the signal source and the reference signal from the reference signal source and generate a second tone at a second frequency;
a receiver module configured to receive the signal from the signal source and a harmonic of the test signal generated by a source of PIM to generate a sample signal at the fixed frequency of the reference signal; and
a receiver configured to determine a shift in phase between the reference signal and the sample signal;
wherein the receiver is configured to determine an estimate of distance to the source of PIM using determinations of the shift in phase as a signal from the signal source is swept.

7. The measuring instrument of claim 6, further comprising: a combiner configured to receive the first tone from the first transmitter module and the second tone from the second transmitter module and output a test signal comprising the first tone and the second tone; and an antenna configured to receive and transmit the test signal.

8. The measuring instrument of claim 7, wherein the antenna is configured to receive the harmonic of the test signal and pass the harmonic to the receiver module using the combiner.

9. The measuring instrument of claim 7, wherein the combiner is a cavity filter including one or more cavities for each tone tuned to a center frequency of each tone.

10. The measuring instrument of claim 6, wherein the first transmitter and the second transmitter are each configured to generate a millimeter wave from a signal provided by the signal source having a frequency from the very high frequency (VHF) and/or ultra high frequency (UHF) range.

11. The measuring instrument of claim 6, further comprising a third transmitter module configured to receive the signal from the signal source and the reference signal from the reference signal source and generate a third tone at a third frequency different from the first frequency and the second frequency that is swept when the signal from the signal source is swept.

12. A method for detecting a source of passive intermodulation (PIM), the method comprising:
using a measuring instrument including
a signal source,
a reference signal source,
a first transmitter module configured to receive a signal from the signal source and a reference signal from the reference signal source and generate a first tone at a first frequency,
a second transmitter module configured to receive the signal from the signal source and the reference signal from the reference signal source and generate a second tone at a second frequency different from the first frequency,
an antenna configured to transmit a test signal comprising the first tone and the second tone,
a receiver module configured to receive the signal from the signal source and a harmonic of the test signal generated by a source of PIM and received at the antenna and generate a sample signal at the fixed frequency of the reference signal, and
a receiver configured to determine a shift in phase between the reference signal and the sample signal;
initiating a plurality of measurements using the measuring instrument that includes a sweep of the signal from the signal source through a range of frequencies;
receiving, in response to the plurality of measurements, an estimate of distance to a source of PIM.

13. The method of claim 12, wherein using the measuring instrument further comprises:
generating a signal using a signal source;
generating a reference signal using a reference signal source;
providing the signal and the reference signal to a first transmitter module configured to generate a first tone at a first frequency;
providing the signal and the reference signal to a second transmitter module configured to generate a second tone at a second frequency different from the first frequency;
transmitting a test signal comprising the first tone and the second tone; and
providing the signal and a harmonic of the test signal generated by a PIM source to a receiver module configured to generate a sample signal having a frequency of the reference signal.

14. The method of claim 13, further comprising:
providing the sample signal and the reference signal to a receiver configured to determine a phase shift between the sample signal and the reference signal; and
determining an estimate of distance to the PIM source using the phase shift determined at a plurality of frequencies of the frequency sweep.

15. The method of claim 12, wherein receiving an estimate of distance to a source of PIM comprises one or more of:
a visual indication of the source of PIM and a distance to the source of PIM;
an audial indication of the source of PIM and a distance to the source of PIM;

and a tactile indication of the source of PIM and a distance to the source of PIM.

* * * * *